United States Patent [19]

Sugi et al.

[11] Patent Number: 5,254,612
[45] Date of Patent: Oct. 19, 1993

[54] STRIPPABLE PROTECTIVE FILM AND COMPOSITION THEREFOR

[75] Inventors: Masahiro Sugi; Mutsuhiro Tanaka, both of Ichihara, Japan

[73] Assignee: Mitsui Petrochemical Industries, Ltd., Tokyo, Japan

[21] Appl. No.: 655,367

[22] PCT Filed: Aug. 7, 1990

[86] PCT No.: PCT/JP90/01008
§ 371 Date: Mar. 1, 1991
§ 102(e) Date: Mar. 1, 1991

[87] PCT Pub. No.: WO91/02028
PCT Pub. Date: Feb. 21, 1991

[30] Foreign Application Priority Data

Aug. 7, 1989 [JP] Japan .................. 1-204215

[51] Int. Cl.$^5$ ............................... C08L 23/20
[52] U.S. Cl. ........................ 524/274; 525/240
[58] Field of Search ............... 524/274; 525/240

[56] References Cited

U.S. PATENT DOCUMENTS

| | | | |
|---|---|---|---|
| 3,630,980 | 12/1971 | Russell | 524/482 |
| 3,635,861 | 1/1972 | Russell | 524/482 |
| 4,284,541 | 8/1981 | Takeda et al. | 524/272 |
| 4,734,328 | 3/1988 | Kohyama et al. | 428/336 |
| 4,769,284 | 9/1988 | Kakugo et al. | 428/349 |

FOREIGN PATENT DOCUMENTS 0129617 2/1985 European Pat. Off. .
55-149364 11/1980 Japan .

OTHER PUBLICATIONS

World Patents Index Latest, week 8104, No. 81-04951D, Derwent Publ. Ltd. London, GB & JP-A-55 149364 (Nitto Electric) 21 Nov. 1980 Abstract.

*Primary Examiner*—Paul R. Michl
*Assistant Examiner*—John J. Guarriello
*Attorney, Agent, or Firm*—Sherman and Shalloway

[57] ABSTRACT

Compositions provided in accordance with the present invention contain 85-20% by weight of a propylene/1-butene random copolymer (A) having a melt index (ASTM D 1238-65T, 230° C.) of 0.1-100 g/10 min, propylene content of 60-85 mol %, and a heat of fusion, as measured by thermal analysis with a differential scanning calorimeter, of 20-80 joule/g, 15-80% by weight of an ethylene/α-olefin copolymer (B) having a melt index (ASTM D 1238-65T, 190° C.) of 0.1-100 g/10 min, ethylene content of 75-95 mol %, crystallinity index of 0-30%, and α-olefin having 3-10 carbon atoms, and 0-10% by weight of a tackifier (C), with the proviso that (A)+(B)+(C) is 100% by weight.

The strippable protective film according to the invention is a single-layer or multi-layer film, with the proviso that at least one of the outermost surface layers of the film is composed of the composition.

The compositions according to the invention are capable of providing strippable protective films which are excellent in flexibility, scratch resistance and heat resistance and, at the same time, which have appropriate initial adhesive power to articles to which they are applied and strippability therefrom and, moreover, which are less in change on standing even when they are stored for an extended period of time and are free from bleeding on the article surface even when they are stripped therefrom.

14 Claims, No Drawings

STRIPPABLE PROTECTIVE FILM AND COMPOSITION THEREFOR

FIELD OF INDUSTRIAL APPLICATION

This invention relates to strippable protective films of polyolefin which are applied temporarily to the surface of manufactured articles such as metal component, plastics product and rubber product for the purposes of preventing them from scratch, contamination or corrosion when they are processed, transported or stored, and which, after fulfilling the above-mentioned purposes, are capable of being stripped therefrom readily and integrally, and to compositions therefor.

TECHNOLOGICAL BACKGROUND

Strippable protective films are applied temporarily to such a manufactured article as metal components, plastics products or rubber products for the purposes of preventing it from scratch, contamination or corrosion at the time when it is processed, transported or stored. The films of the type are required to have such characteristics that after they have been applied temporarily to the above-mentioned manufactured article and have fulfilled the above-mentioned purposes, they are capable of being stripped therefrom readily and integrally.

Heretofore, there have been used resin compositions for strippable protective films, said resin compositions containing their principal components, for examples, ethylene/vinyl acetate copolymers (hereinafter abbreviated to EVA) or ethylene/α-olefin copolymers having a low crystallinity. While these resin compositions have favorable initial adhesive properties, they involve such drawbacks that because of their poor heat resistance, films prepared therefrom increase in adhesive force during a long-term storage thereof, particularly when they are held under the circumstances of high temperature, and sharply deteriorate in strippability.

Japanese Patent Publn. No. 45974/1983 proposes strippable protective films of polyolefin obtained by improving heat resistance of EVA films.

Although the heat resistance of the proposed films has been improved, however, there were such problems that the films increase in adhesive force due to change on standing when they are stored for a long period of time, or when they are stripped from articles to which they are applied, bleeding matters remain on the surface of the articles.

The present invention is intended to solve such problems associated with the prior art as mentioned above, and accordingly an object of the invention is to provide strippable protective films which are excellent in flexibility, scratch resistance and heat resistance and, at the same time, which have appropriate initial adhesive force to articles to which they are applied and strippability therefrom and, moreover, which are less in change on standing even when they are stored for an extended period of time and are free from bleeding on the article surface when they are stripped therefrom, and compositions therefor.

DISCLOSURE OF THE INVENTION

The compositions for strippable protective films according to the present invention contain 85–20% by weight of a propylene/1-butene random copolymer (A) having a melt index (ASTM D 1238-65T, 230° C.) of 0.1–100 g/10 min, propylene content of 60–85 mol % and a heat of fusion, as measured by thermal analysis with a differential scanning calorimeter, of 20–80 joule/g, 15–80% by weight of an ethylene/α-olefin copolymer (B) having a melt index (ASTM D 1238-65T, 190° C.) of 0.1–100 g/10 min, ethylene content of 75–95 mol %, crystallinity index of 0–30%, and α-olefin having 3–10 carbon atoms, and 0–10% by weight of a tackifier (C), with the proviso that (A)+(B)+(C) is 100% by weight.

The above-mentioned tackifier (C) used in the invention includes usually one or two or more resins such as aliphatic hydrocarbon resins, aromatic hydrocarbon resins, aliphatic/aromatic copolymer hydrocarbon resins, alicyclic hydrocarbon resins, synthetic terpene hydrocarbon resins, terpene hydrocarbon resins, coumarone-indene hydrocarbon resins, low molecular weight styrene resins and rosin hydrocarbon resins.

The strippable protective films according to the invention are a single-layer or multi-layer films, with the proviso that at least one of the outermost surface layers is composed of the composition according to the invention as illustrated above.

PREFERRED EMBODIMENT OF THE INVENTION

The strippable protective films and compositions therefor according to the present invention are illustrated below in detail.

The compositions for strippable protective films according to the invention contain a propylene/1-butene random copolymer (A) and an ethylene/α-olefin copolymer (B), and the compositions may contain a tackifier (C) in addition to the above-mentioned components (A) and (B).

The propylene/1-butene random copolymer (A) used in the invention has a melt index (230° C.) of 0.1–100 g/10 min, preferably 0.5–50 g/10 min, propylene content of 60–85 mol %, and a heat of fusion, as measured by thermal analysis with a differential scanning calorimeter, of 20–80 joule/g. The propylene/1-butene random copolymer having such characteristics as mentioned above are excellent in flexibility, scratch resistance and heat resistance. Accordingly, films prepared by using such copolymers as defined above can be improved in heat resistance, with the result that the films can be prevented from change of adhesive property with time during storage thereof.

The propylene/1-butene random copolymer (A) may be prepared by copolymerization of propylene and 1-butene in the presence of catalysts formed from a solid titanium catalyst component and organometallic compound component, or those formed from these two components and an electron donor.

The solid titanium catalyst component used herein includes titanium trichloride or titanium trichloride compositions prepared by various known processes, or a titanium catalyst component supported on a carrier having suitably a specific surface area of more than 100 m$^2$/g and containing magnesium, halogen, an electron donor, preferably an aromatic carboxylic acid ester or alkyl-containing ether, and titanium as essential ingredients. In the invention, the propylene/1-butene random copolymers are preferably those prepared by using the latter out of the two types of titanium catalyst components as mentioned above.

The organometallic compound component used herein are preferably those of organoaluminum compounds, including concretely trialkylaluminum, dialkylaluminum halide, alkylaluminum sesquihalide, alkylaluminum dihalide, etc.

In the present invention, the organometallic compound components preferably used vary depending upon the kind of the titanium catalyst component used.

The electron donors used herein include concretely organic compounds containing nitrogen, phosphorus, sulfur, oxygen, silicon or boron. For example, preferred electron donors are esters or ethers of these organic compounds.

The ethylene/α-olefin copolymer (B) used in the present invention has a melt index (190° C.) of 0.1–100 g/10 min, preferably 0.5–50 g/10 min, ethylene content of 75–95 mol %, crystallinity index of 0–30%, and α-olefin used has 3–10 carbon atoms. By virtue of using such ethylene/α-olefin copolymer as having the properties defined above in combination with the propylene/1-butene random copolymer (A), it becomes possible to impart tackiness to the composition containing these two copolymers.

The α-olefin having 3–10 carbon atoms as referred to herein includes concretely propylene, butene-1, pentene-1, hexene-1, 4-methylpentene-1, 3-methylpentene-1, heptene-1, octene-1, nonene-1, decene-1, dodecene-1, tetradecene-1, octadecene-1, etc.

The ethylene/α-olefin copolymer (B) as mentioned above may be prepared by random polymerization of monomers in the presence of catalyst systems comprising soluble vanadium compounds and alkylaluminum halide compounds.

The soluble vanadium compounds used as polymerization catalysts include concretely vanadium tetrachloride, vanadium oxytrichloride, vanadium triacetylacetonate, oxyvanadium triacetylacetonate, etc.

The alkylaluminum halide compounds which are used in combination with the soluble vanadium compounds to constitute the polymerization catalysts include concretely ethylaluminum dichloride, diethylaluminum monochloride, ethylaluminum sesquichloride, diethylaluminum monobromide, diisobutylaluminum monochloride, isobutylaluminum dichloride, isobutylaluminum sesquichloride, etc.

The above-mentioned polymerization may be carried out by maintaining the reaction system at a state of solution or suspension, or at a region intermediate between the two, and in every case it is preferable to use inert solvents as reaction media. The solvents used in the polymerization reaction include aliphatic hydrocarbons of about 3–12 carbon atoms, for example, propane, butane, pentane, hexane, heptane, octane, nonane, decane, undecane, dodecane and kerosene, or halogenated hydrocarbons, for example, methyl chloride, ethyl chloride, ethylene dichloride, etc., and these solvents may be used either singly or in admixture. The polymerization temperature employed is usually from 0° to 100° C.

In the present invention, it is preferable to use further the tackifier (C) in order to obtain an appropriate strength of the initial adhesive force between the base resin comprising the propylene/1-butene random copolymer (A) and the article to which the film composed of said base resin is applied. This tackifier (C) is a solid amorphous polymer which is commonly used as a tacky producing resin in the field of adhesive tapes, coating compositions and hot-melt adhesives. The tackifier (C) includes the following resins classified according to the source of monomers to be polymerized.

For example, aliphatic hydrocarbon resins derived mainly from $C_4$ cut, $C_5$ cut obtained by cracking of petroleum or naphtha or mixtures thereof, or of isoprene and 1,3-pentadiene present, for example, in $C_5$ cut;

aromatic hydrocarbon resins derived mainly from styrene derivatives and indenes present in $C_9$ cut obtained by cracking of petroleum or naphtha;

aliphatic/aromatic copolymer hydrocarbon resins obtained by copolymerization of any of $C_4$ and $C_5$ cut with $C_9$ cut;

alicyclic hydrocarbon resins obtained by hydrogenation of aromatic hydrocarbon resins;

synthetic terpene hydrocarbon resins having a structure containing aliphatic, alicyclic and aromatic hydrocarbons;

terpene hydrocarbon resins derived from $\alpha,\beta$-pinene;

coumarone-indene hydrocarbon resins derived from indene and styrenes present in coal tar naphtha;

low molecular weight styrene resins, and rosin hydrocarbon resins.

Of the tackifiers (C) as illustrated above, preferred are aliphatic hydrocarbon resins and alicyclic hydrocarbon resins obtained by hydrogenation of aromatic hydrocarbon resins because of their favorable compatibility with the aforementioned component (A), and particularly preferred are alicyclic hydrocarbon resins obtained by hydrogenation of aromatic hydrocarbon resins, in which the softening point (ring and ball method) is 70°–150° C., preferably 80°–140° C. and the degree of hydrogenation of the aromatic nucleus is more than 80%, preferably more than 85%.

The compositions for strippable protective films according to the present invention contain 85–20% by weight, preferably 80–35% by weight of the above-mentioned propylene/1-butene random copolymer (A), 15–80% by weight, preferably 20–65% by weight of the ethylene/α-olefin copolymer (B) and 0–10% by weight of the tackifier (C), with the proviso that (A)+(B)+(C) is 100% by weight.

By blending the above-mentioned components (A), (B) and (C) in such proportions as defined above, the resulting compositions make it possible to obtain appropriate adhesive force in the films formed therefrom and, moreover, minimize change in properties of said films with time, secure strippability of said films from articles after application thereto, and prevent the films from blocking or from bleeding.

The compositions for strippable protective films according to the invention may contain other resin components or various additives such as antioxidants, ultraviolet absorbers, slip agents, nucleating agents, antistatic agents, flame retardants, pigments, dyes, and inorganic or organic fillers, as far as they are compatible with the object of the invention.

The compositions for strippable protective films according to the invention may be prepared by any known processes, for example, mixing the components together by means of a mixing machine such as a V-blender, ribbon blender, tumbling blender or Henschel mixer, and/or kneading the components together by means of a kneading machine such as a mixing roll, Banbury mixer or kneader.

The strippable protective films according to the invention comprise films composed of the compositions as mentioned above. The strippable protective film according to the invention may be a single-layer film composed of the above-mentioned composition, as it is, or may be a laminated film with other resin film. When used as a laminated film with other resin film, the film composed of the above-mentioned composition of the invention is used to become at least one of the outermost surface layers of the laminated film. In that case, the other resin film used as a base layer is desirably a film of polyolefin, such as polyethylene, polypropylene or poly-1-butene, which is well adherent to the above-mentioned composition according to the invention. However, the film according to the invention may also be laminated through other adhesive layer with a film of polyamide or polyester.

The strippable protective film according to the invention may be prepared by extrusion molding the above-mentioned composition by means of a film extruder such as T-die extruder into a single-layer film or a laminated film with other resin film.

The strippable protective films thus prepared comprising the layer composed of the composition according to the invention are allowed to cover articles of manufacture such as metal components, plastics products or rubber products so that the layer is applied directly to the surface of the articles as an adhesive, thereby preventing said articles from scratch, contamination or corrosion at the time when they are processed, transported or stored.

In that case, because of appropriate adhesive properties of the layer composed of the composition according to the invention, the strippable protective film according to the invention easily cover the articles of manufacture by the aid of adhesion thereto and are readily strippable therefrom and, at the same time, are less in change of adhesive force with time and capable of maintaining adhesive properties and strippability for a long period of time. Furthermore, this film is excellent in scratch resistance and also free from a blocking phenomenon, and hence the film is easily processed at a state where it is covering an article, and the article thus covered is protected from scratch, contamination or the like.

EFFECT OF THE INVENTION

The compositions for strippable protective films according to the present invention contain a specific propylene/1-butene random copolymer (A), an ethylene/α-olefin copolymer (B) and a tackifier (C) in specific proportions, and therefore they are capable of providing strippable protective films which are excellent in flexibility, scratch resistance and heat resistance, and which also have appropriate initial adhesive force and strippability to and from an article to be covered therewith, and are excellent in cold processability at the time of covering the article and, moreover, less in change of properties with time even when stored for a long period of time, and leave no bled matters on the surface of the article when stripped therefrom.

The present invention is illustrated below with reference to examples, but it should be construed that the invention is in no way limited to those examples.

EXAMPLES 1-3

Preparation of propylene/1-butene random copolymer

A catalyst component comprising 200 g of anhydrous magnesium chloride, 46 ml of ethyl benzoate and 30 ml of methyl polysiloxane was subjected to ball milling treatment in a nitrogen atmosphere, and the catalyst component thus treated was suspended in titanium tetrachloride and filtered. Subsequently, into a 20 l stainless steel polymerizer equipped with a stirring blade were fed the thus treated catalyst component so that the titanium concentration became 0.01 mmol/l, triethylaluminum so that the concentration thereof in the polymerizer became 1.0 mmol/l, and methyl p-toluylate as an electron donor so that the concentration thereof in the polymerizer became 0.33 mmol/l, and simultaneously a mixed gas of propylene and 1-butene (propylene 68 mol %, 1-butene 32 mol %) was fed at a rate of 4 kl/hr to the polymerizer, whereby copolymerization reaction was carried out at 70° C. using n-heptane as a polymerization medium.

The thus obtained propylene/1-butene random copolymer had the propylene content, as measured by nuclear magnetic resonance, of 71.0 mol %, a melting point of 110° C., a heat of fusion of 50 joule/g and a melt index (230° C.) of 7.0 g/10 min.

Preparation of ethylene/1-butene random copolymer

Using vanadium oxytrichloride and ethylaluminum sesquichloride as catalysts, a mixture of ethylene and 1-butene was polymerized in hexane at 50° C. in the presence of hydrogen.

The thus obtained ethylene/1-butene random copolymer had the ethylene content of 90 mol %, a density of 0.889 g/cm$^3$ and a melt index (190° C.) of 3.5 g/10 min.

Preparation of composition and film

The propylene/1-butene random copolymer (hereinafter abbreviated to PBC) and ethylene/1-butene random copolymer (hereinafter abbreviated to EBC) obtained above were mixed together in proportions as indicated in Table 1 by means of a tumbling blender for 2 minutes, and the mixture was then fed to an extruder of 40 mm $\phi$ (preset temperature=230° C.) to prepare a composition.

Subsequently, this composition was formed into a single-layer film of 50 μm in thickness by means of a T-die molder (preset temperature=230° C.).

The composition and film thus prepared were tested for physical properties by the following procedure.

Adhesive force to article to be covered

The film prepared above is applied to a substrate made of polycarbonate or acrylic resin preheated to 55° C. using a pinch roll at a linear pressure of 3.6 kg/cm. Thereafter, the substrate thus covered was allowed to stand in an air oven at 50° C. for a predetermined period of time, and then the adhesive force of the film was determined by 180° peel test (peeling rate: 300 mm/min).

Surface hardness

A pressed sheet of 2 mm in thickness was prepared from the above-mentioned composition (200° C., quenching), and the sheet was tested for surface hardness in accordance with ASTM D-2240.

Surface profile

After stripping the film from the substrate in the above-mentioned peel test, the surface profile of said substrate was visually evaluated according to the following ratings:
○ : Not stained
△ : Stained slightly
x : Stained
Results obtained are shown in Table 1.

EXAMPLE 4

Example 1 was prepared except that a resin composition prepared by mixing the PBC and EBC further with an alicyclic hydrocarbon resin (a product of Arakawa Kagaku K.K. sold under a trade name of "ALCON P125") in proportions as indicated in Table 1.

Results obtained are shown in Table 1.

EXAMPLE 5

In the process of preparing the ethylene/1-butene random copolymer shown in Example 1, a mixture of ethylene and propylene was polymerized in place of the mixture of ethylene and 1-butene in the same manner as in said process.

The thus obtained ethylene/propylene copolymer (hereinafter abbreviated to EPC) had the ethylene content of 81 mol %, a density of 0.865 g/cm$^3$ and a melt index (190° C.) of 4.5 g/10 min.

Thereafter, Example 1 was repeated except that there was used a composition prepared by mixing the PBC with the EPC obtained above in the proportion as indicated in Table 1.

Results obtained are shown in Table 1.

EXAMPLE 6

Example 4 was repeated except that there was used a composition prepared by mixing the PBC, EPC and ALCON P125 in proportions as indicated in Table 1.

Results obtained are shown in Table 1.

Comparative Example 1

Example 1 was repeated except that the PBC was used alone in place of the composition used therein.

Results obtained are shown in Table 1.

Comparative Example 2

Comparative Example 1 was repeated except that in place of the PBC used therein, there was used a composition prepared by mixing the PBC and EBC in the proportion as indicated in Table 1.

Results obtained are shown in Table 1.

Comparative Example 3

Comparative Example 1 was repeated except that in place of the PBC used therein, there was used the EBC alone.

Results obtained are shown in Table 1.

Comparative Example 4

Comparative Example 1 was repeated except that in place of the PBC used therein, there was used an ethylene/vinyl acetate copolymer (EVA) (a product of Du Pont-Mitsui Polychemicals Co., Ltd. sold under a trade name of "P-2505") having a melt index (190° C.) of 2 g/10 min, the vinyl acetate content of 25% by weight, and a density of 0.95 g/cm$^3$.

Results obtained are shown in Table 1.

TABLE 1

|  | Ex. 1 | Ex 2 | Ex. 3 | Ex. 4 | Ex. 5 | Ex. 6 | Comp. Ex. 1 | Comp. Ex 2 | Comp. Ex. 3 | Comp. Ex. 4 |
|---|---|---|---|---|---|---|---|---|---|---|
| PBC (Wt. part) | 50 | 80 | 35 | 45 | 75 | 75 | 100 | 15 |  |  |
| EBC (Wt. part) | 50 | 20 | 65 | 50 |  |  |  | 85 | 100 |  |
| EPC (Wt. part) |  |  |  |  | 25 | 20 |  |  |  |  |
| ALCON P125 (Wt. part) |  |  |  | 5 |  | 5 |  |  |  |  |
| EVA (Wt. part) |  |  |  |  |  |  |  |  |  | 100 |
| Adhesive force to article to be covered (g/25 mm) (50° C.) |  |  |  |  |  |  |  |  |  |  |
| Polycarbonate substrate |  |  |  |  |  |  |  |  |  |  |
| After 1 day | 6.5 | 4.2 | 7.0 | 12.1 | 13.4 | 18.2 | 0.5 | 7.0 | 10.4 | 6.7 |
| After 15 days | 10.3 | 6.5 | 14.6 | 16.6 | 15.6 | 19.7 | 1.2 | 25.1 | 40.3 | 35.1 |
| After 30 days | 11.2 | 7.0 | 15.1 | 18.4 | 16.3 | 19.8 | 1.3 | 27.4 | 45.3 | 40.0 |
| Acrylic resin substrate |  |  |  |  |  |  |  |  |  |  |
| After 1 day | 8.1 | 4.5 | 8.0 | 14.5 | 14.2 | 17.2 | 0.4 | 10.1 | 13.3 | 8.1 |
| After 15 days | 12.5 | 8.3 | 15.5 | 18.3 | 17.1 | 19.1 | 0.8 | 24.3 | 25.4 | 34.3 |
| After 30 days | 17.2 | 8.5 | 19.2 | 21.4 | 17.0 | 20.1 | 1.0 | 33.3 | 35.4 | 38.3 |
| Surface hardness (Shore-D) | 45 | 50 | 43 | 44 | 41 | 44 | 55 | 32 | 28 | 25 |
| Surface profile of article covered | ○ | ○ | ○ | ○ | ○ | ○ | ○ | ○ | ○ | X |

What is claimed is:

1. A composition for a strippable protective film, which contains 85-20% by weight of a propylene/1-butene random copolymer (A) having a melt index (230° C.) of 0.1-100 g/10 min, propylene content of 60-85 mol %, and a heat of fusion of 20-80 joule/g, 15-80% by weight of an ethylene/α-olefin copolymer (B) having a melt index (190° C.) of 0.1-100 g/10 min, ethylene content of 75-95 mol %, crystallinity index of 0-30%, and an α-olefin having 3-10 carbon atoms, and 0-10% by weight of a tackifier (C), wherein (A)+(B)+(C) is 100% by weight.

2. The composition for a strippable protective film as claimed in claim 1 wherein the tackifier (C) is a member selected from the group consisting of aliphatic hydrocarbon resins, aromatic hydrocarbon resins, aliphatic-/aromatic copolymer hydrocarbon resins, alicyclic hydrocarbon resins, synthetic terpene hydrocarbon resins, terprene hydrocarbon resins, cuomarone-indene hydrocarbon resins, low molecular weight styrene resins and rosin hydrocarbon resins.

3. A strippable protective film which is a single-layer or multi-layer film, wherein at least one of the outermost surface layers of the film is composed of the composition as claimed in claim 1 or 2.

4. The composition of claim 1 wherein the copolymer B α-olefin is propylene or butene-1.

5. The composition of claim 2 wherein the copolymer B α-olefin is propylene or butene-1.

6. A strippable protective film which is a single-layer or multi-layer film wherein at least one of the outermost surface layers of the film consists essentially of 85-20% by weight of a propylene/1-butene random copolymer (A) having a melt index (230° C.) of 0.1–100 g/10 min and a propylene content of 60–85 mol %, and 15–80% by weight of an ethylene/α-olefin copolymer (B) having a melt index (190° C.) of 0.1–100 g/10 min and ethylene content of 75–95 mol %, and an α-olefin having 3 to 10 carbon atoms, wherein (A)+(B) is 100% by weight.

7. The strippable protective film of claim 6, wherein the copolymer A has a melt index (230° C.) of 0.5–50 g/10 min and the copolymer B has a melt index (190° C.) of 0.5–50 g/10 min.

8. The strippable protective film of claim 6, wherein the copolymer B α-olefin is propylene or butene-1.

9. A strippable protective film which is a single-layer or multi-layer film wherein at least one of the outermost surface layers of the films consists essentially of 85–20% by weight of a propylene/1-butene random copolymer (A) having a melt index (230° C.) of 0.1–100 g/10 min and a propylene content of 60–85 mol %, 15–80% by weight of an ethylene/α-olefin copolymer (B) having a melt index (190° C.) OF 0.1–100 g/10 min and ethylene content of 75–95 mol %, and an α-olefin having 3 to 10 carbon atoms, and an effective tackifier amount up to 10% by weight of a tackifier (C), wherein (A)+(B)+(C) is 100% by weight.

10. The strippable protective film of claim 9, wherein the copolymer A has a melt index (230° C.) of 0.5–50 g/10 min and the copolymer B has a melt index (190° C.) of 0.5–50 g/10 min.

11. The strippable protective film of claim 9 wherein the copolymer B α-olefin is propylene or butene-1.

12. The strippable protective film of claim 9 wherein the component (C) consists of 5% by weight of tackifier.

13. The strippable protective film of claim 9 wherein the component (C) tackifier is a member selected from the group consisting of aliphatic hydrocarbon resins, aromatic hydrocarbon resins, aliphatic/aromatic copolymer hydrocarbon resins, alicyclic hydrocarbon resins, synthetic terpene hydrocarbon resins, terpene hydrocarbon resins, cuomarone-indene hydrocarbon resins, low molecular weight styrene resins and rosin hydrocarbon resins.

14. The strippable protective film of claim 9 wherein the component (C) tackifier is an alicyclic hydrocarbon resin.

* * * * *